Sept. 10, 1968   W. E. CREEL ET AL   3,400,966
HYDRAULIC LOG TONG
Filed Sept. 21, 1966   2 Sheets-Sheet 1
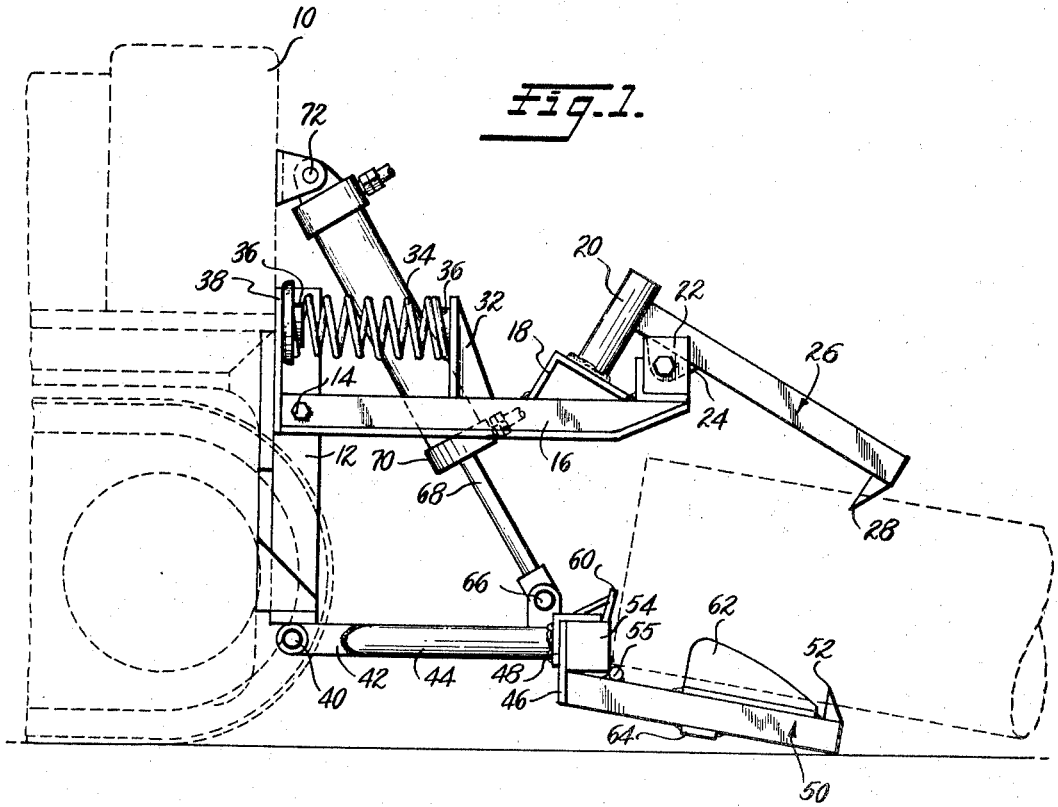
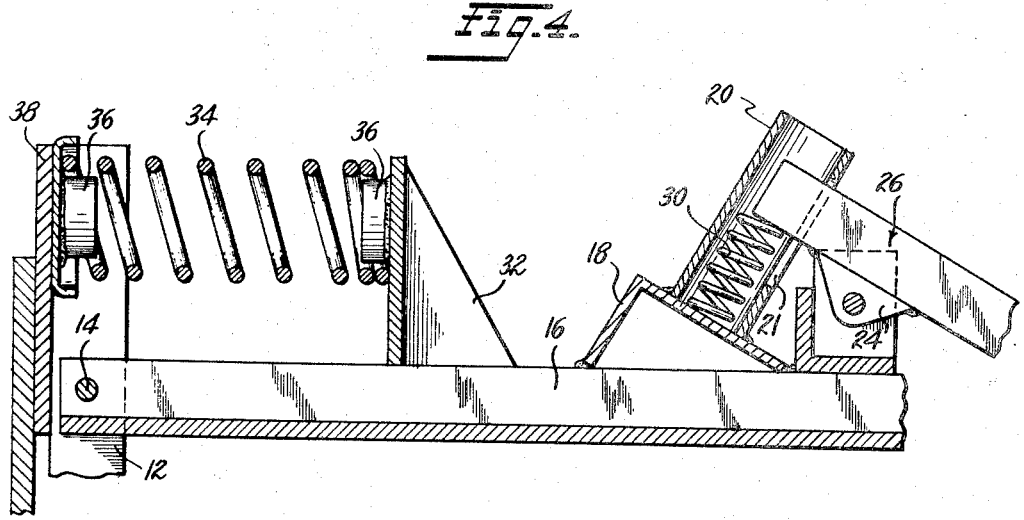
INVENTORS
WILLIAM ELBERT CREEL
EDWARD FARLEY
Bacon & Thomas
ATTORNEYS

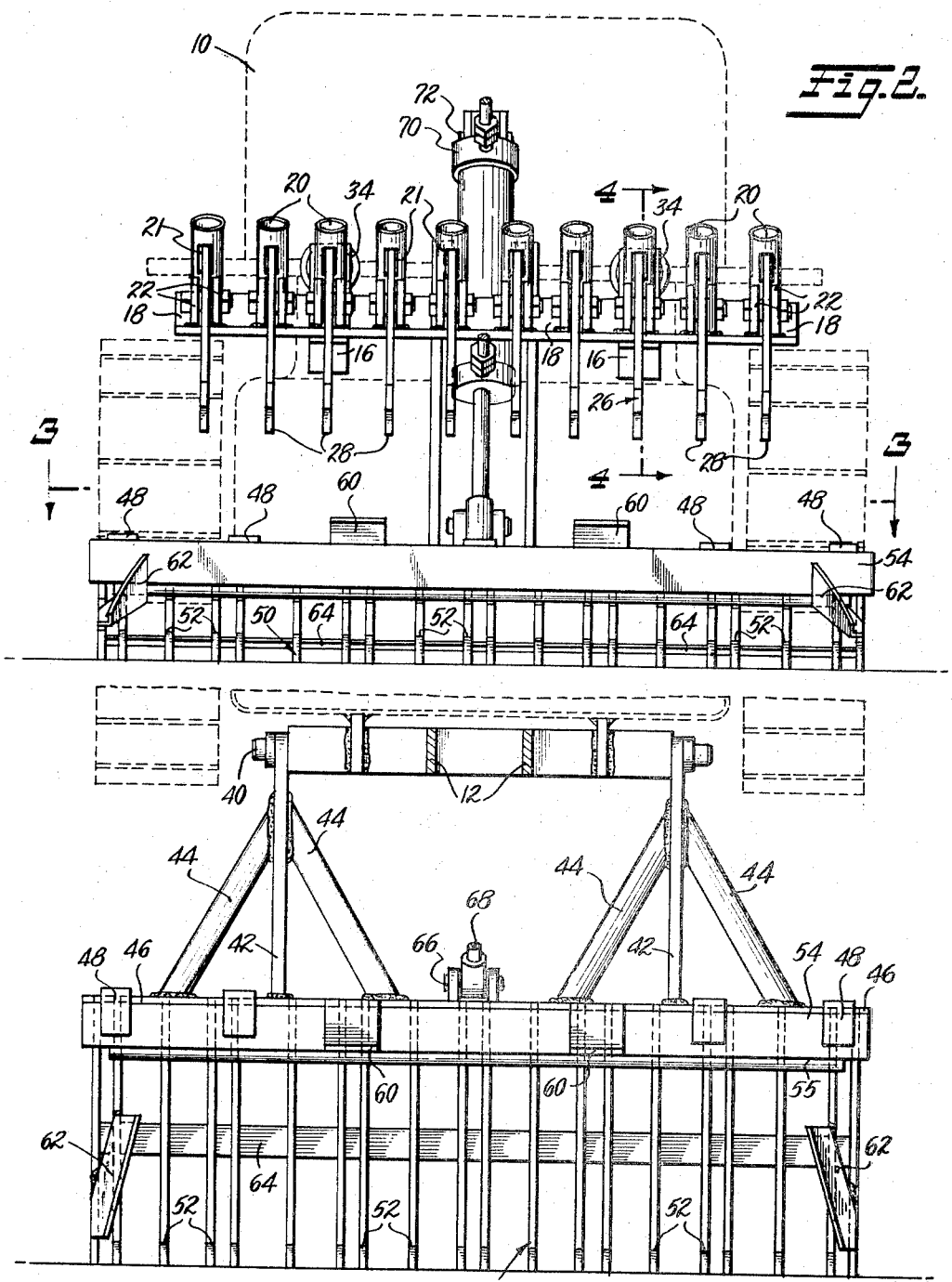

3,400,966
HYDRAULIC LOG TONG
William Elbert Creel, Rte. 1, Brent, Ala. 35034, and Edward Farley, Rte. 1, Duncanville, Ala. 35456
Filed Sept. 21, 1966, Ser. No. 580,979
3 Claims. (Cl. 294—87)

ABSTRACT OF THE DISCLOSURE

A tractor-mounted frame has an upper plurality of forwardly extending and separately pivoted arms spring urged to swing downwardly and each has a downwardly facing pointed prong at its front end. A lower assembly is pivoted to the frame and has upwardly facing pointed prongs at its forward end. A hydraulic motor lifts the lower assembly to grip the end of a log between the opposed upper and lower prongs and the tractor can then drag the log endways.

---

This invention relates to a tractor-mounted log handler, which drags logs cut to suitable lengths from the logging site. In logging operations, after the trees are felled, the trunk is cut to suitable lengths. These lengths are removed from the site by tractors or lift fork type devices which engage the log sections in the center of the log, pick up and grip them and carry them to a shipping point. In logging operations, stumps and undergrowth often make the manipulation of the tractor difficult and also require a relatively wide clear path at least as wide as the log sections or the logging must be snaked out by a winch line. All of these operations require man power other than the tractor operator.

This invention has for an object a tractor-mounted construction which obviates these difficulties and can engage one or more logs. It comprises elongated members with impaling means which engage the cut ends of the logs. This enables the logs to be engaged from the cut ends even though they are not properly oriented relative to the device. Further objects will be obvious from the following specification.

In the drawings:

FIG. 1 is a side elevational view of the hydraulic log tong attachment of our present invention, the outline of a conventional tractor being shown in dotted lines for purposes of clarity;

FIG. 2 is a front elevational view of the hydraulic log tong attachment of FIG. 1;

FIG. 3 is a horizontal sectional view taken on the line 3—3 of FIG. 2; and

FIG. 4 is an enlarged fragmentary vertical sectional view taken on the line 4—4 of FIG. 2.

Referring to the drawings, there is indicated at 10 a tractor to which the log handling structure is mounted. Mounted on the tractor is a rigid base frame 12. Pivoted at 14 to the frame 12 are forwardly extending beams 16, the outer ends of which are connected together by a rigid angle iron 18 extending across the beams and fixed thereto as shown in FIG. 2. Extending upwardly normal to one flange of the angle iron 18 there is a series of stub tubes 20 welded to the angle iron 18 and pairs of opposed brackets 22 forwardly of each stub tube 20. Arms 26 are pivoted between brackets 22 by plates 24 welded thereto, see particularly FIG. 4, and define an upper bank of arms. Each arm 26 has a pointed log impaling point 28 at its forward end. Tubes 20 are provided with slots 21 through which the rear ends of arms 26 extend. Within tubes 20 are springs 30 (see FIG. 4) which engage the rear ends of arms 26 and urge the same clockwise as shown in FIGS. 1 and 4. Also mounted on beams 16 are brackets 32 which retain heavy coil springs 34 between them and opposed spring sockets 36 attached to an upper cross member 38 of frame 12.

Pivotally attached at 40 to the lower portion of the frame are outwardly extending supporting arms 42, see FIG. 3, which are braced by diagonal members 44 to a cross beam 46. Suitably attached to a cross beam 46, as by angle brackets 48, is a lower bank of arms 50, which terminate in upwardly extending impaling or grasping points 52 at their forward ends.

The arms 42 also support a square bumper log 54 held to the arms as by angle brackets 48. In front of the log and welded to the arms 50 is a rod 55 which serves to cross brace the arms and lock the log 54 at a slight angle of the arms, as shown in FIG. 1. Also attached to beam 46 and projecting above the log 54 are brackets 60 which serve as stops for a log which may ride over the square bumper log 54. The endmost arms of the bank of arms 50 are not pointed, but carry angle plates 62 fixed thereto which serve to guide the ends of any logs engaging them toward the center of the lower bank of arms. The lower bank of arms 50 is further braced by a strip 64 welded to each arm.

Pivotally attached at 66 to cross beam 46 is a piston rod 68 of a fluid motor 70. The upper end of the motor cylinder is pivoted at 72 to the tractor 10.

In operation, the tractor is driven forwardly with the lower bank of arms near or at ground level. A cut log or several logs are approached, cut-end on. The cut end of a log or several logs will ride over the points 52 of the lower bank of arms and if they are near the outer arms will be deflected toward the center of the bank so that they can be engaged by the impaling members 28 of the upper bank of arms, it being noted that the terminal arms of the upper bank do not extend laterally beyond the tractor treads, while the lower bank does, see FIG. 2. Those arms 26 engaged by the logs are pivoted upwardly against the action of springs 30. When the cut end of the logs engage bumper log 54, the tractor operator actuates motor 70 to cause the lower set of arms to lift. This causes points 52 to impale the logs and to lift the end of the logs. Further lift of the logs causes beam 16 to pivot against the action of the heavy springs 34. The logs are thus firmly grasped and can be dragged endwise to any suitable location for further handling or processing.

What we claim is:

1. In a log handling apparatus, a support means adapted to be mounted vertically at an end of a tractor, an upper bank of parallel arms each pivotally mounted relative to the support means, a lower bank of rigidly connected arms, also pivotally mounted as a whole relative to the support means, grasping means adjacent the outer ends of the arms of both banks of arms and power means for raising and lowering the lower bank, said upper bank of arms comprising beams pivoted on the support means, a bank of grasping arms pivoted to outer ends of the beams, spring means individual to the grasping arms and spring means resisting upward pivotal movement of the beams.

2. The apparatus of claim 1 including supporting arms for the lower bank of connected grasping arms and bumper means attached to the supporting arms at the inward end of the grasping arms.

3. The apparatus of claim 1 including deflector plates attached to the terminal arms of the lower bank and arranged to deflect log ends inwardly toward the center of said lower bank.

References Cited

UNITED STATES PATENTS

| | | | |
|---|---|---|---|
| 2,815,878 | 12/1957 | Vance | 294—88 X |
| 3,126,223 | 3/1964 | Kughler | 294—103 |

EDWARD A. SROKA, *Primary Examiner.*

R. D. GUIOD, *Assistant Examiner.*